July 8, 1952    G. E. DATH    2,602,663
FRICTION SHOCK ABSORBER FOR RAILWAY CAR TRUCKS
Filed July 23, 1949

Inventor:
George E. Dath.
By Henry Fuchs.
Atty.

Patented July 8, 1952

2,602,663

UNITED STATES PATENT OFFICE 2,602,663

FRICTION SHOCK ABSORBER FOR RAILWAY CAR TRUCKS

George E. Dath, Mokena, Ill., assignor to W. H. Miner, Inc., Chicago, Ill., a corporation of Delaware Application July 23, 1949, Serial No. 106,478

1 Claim. (Cl. 267—9)

This invention relates to improvements in friction shock absorbers especially adapted for use in connection with railway car truck springs for snubbing or dampening the vertical action of the same.

One object of the invention is to provide a friction shock absorber of the character indicated, including a casing provided with interior, opposed friction wedge faces at each end thereof, a pair of opposed friction shoes at each end of the casing having friction wedge faces engaging the friction wedge faces at the corresponding end of the casing, and a rubber shock absorbing element within the casing compressible lengthwise by inward movement of the shoes at opposite ends of the mechanism and yieldingly opposing relative lateral approach of the shoes of each pair.

A further object of the invention is to provide a mechanism as set forth in the preceding paragraph, wherein the opposite ends of the rubber element are embraced, respectively, between the pairs of shoes at opposite ends of the casing to be compressed laterally between said shoes as the latter are forced inwardly of the casing.

Other objects of the invention will more clearly appear from the description and claim hereinafter following.

Figure 1:
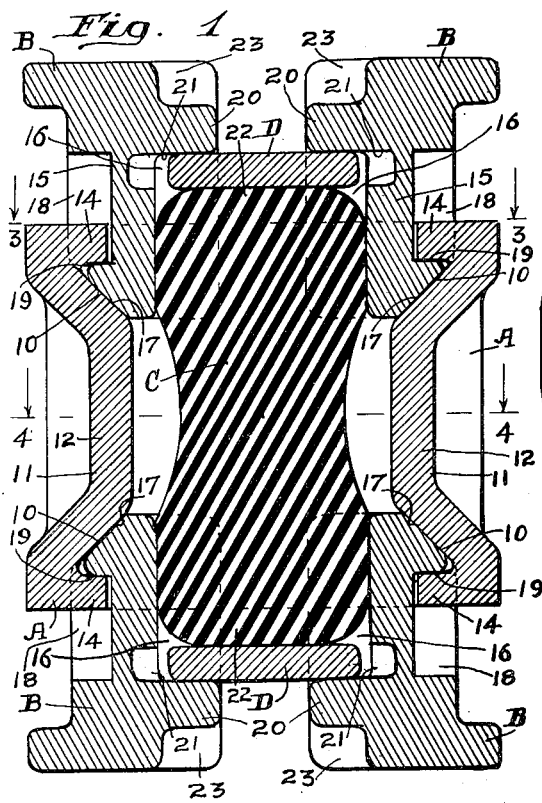
Figure 2:
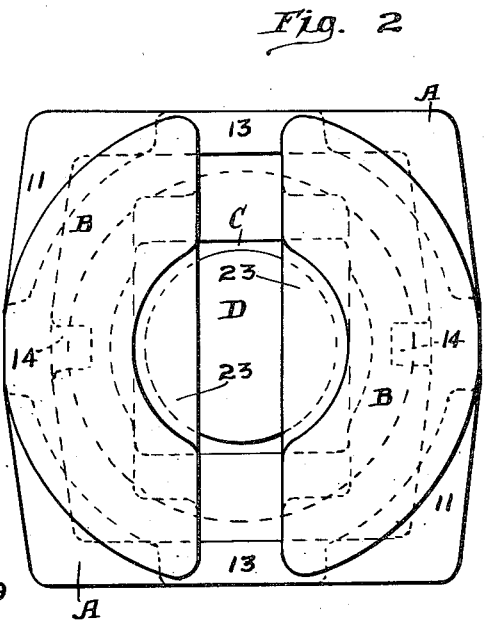
Figure 3:
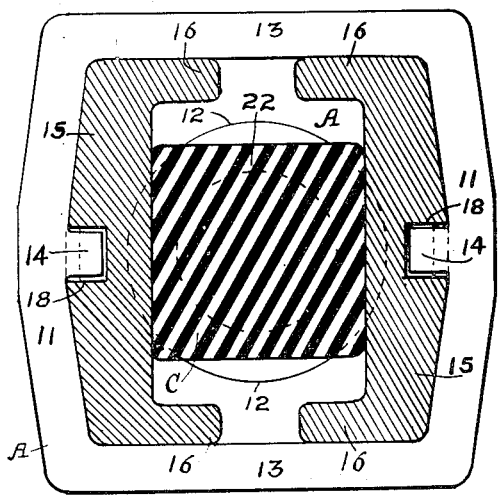
Figure 4:
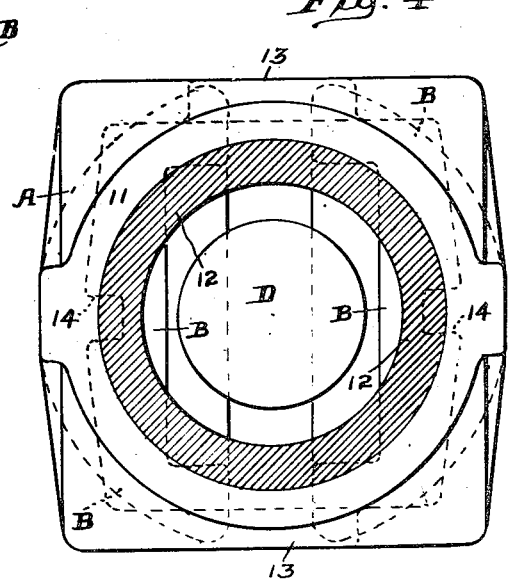

In the accompanying drawing forming a part of this specification, Figure 1 is a longitudinal, vertical sectional view of my improved friction shock absorber. Figure 2 is a top plan view of Figure 1. Figure 3 is a horizontal sectional view, corresponding substantially to the line 3—3 of Figure 1. Figure 4 is a horizontal sectional view, corresponding substantially to the line 4—4 of Figure 1, with the rubber element omitted.

As shown in the drawing, my improved shock absorber comprises broadly a casing A, two pairs of friction wedge shoes B—B and B—B, a rubber block C, and follower plates D—D.

The casing A is in the form of a substantially rectangular, boxlike sleeve open at its top and bottom ends. At each end of the casing A are opposed, interior friction wedge faces 10—10 and 10—10, located on opposite side walls 11—11 of the casing. Each side wall 11 is preferably inset between the friction wedge faces 10—10 thereof, as indicated at 12. As shown in Figure 2, the side walls 11—11 are bulged outwardly in transverse direction to provide a V-shaped formation. The remaining two side walls of the casing, which are indicated by 13—13, are substantially straight transversely. Stop lugs 14—14 and 14—14, which project inwardly from the side walls 11—11, are provided at opposite ends of the casing, each lug projecting from the central portion of the side wall 11 and overhanging the friction wedge face at the corresponding end of the casing.

The friction wedge shoes B—B and B—B are arranged in pairs at opposite ends of the casing A. Each shoe B is in the form of a channel member in transverse section, comprising a platelike portion 15, having vertically disposed, laterally inwardly projecting flanges 16—16 at opposite sides thereof. The platelike portion 15 is of V-shaped, transverse cross section to correspond in shape with the cooperating side wall 11. Each shoe has a friction wedge face 17 at its lower end, at the outer side thereof, engaged with the corresponding friction wedge face 10 of the casing. The outer surface of the platelike portion 15 of the shoe is vertically slotted, as indicated at 18, to slidingly accommodate the corresponding stop lug 14 of the casing A, the lower end wall of said slot providing a shoulder 19, engageable with the lug 14 to limit outward movement of the shoe. The shoes B—B of each pair have aligned, laterally inwardly projecting flanges 20—20 thereon, forming abutments for the follower plate D at the corresponding end of the mechanism, and the vertical wall of each shoe, below the flange 20 thereof, is slotted transversely, as indicated at 21, to provide clearance for said follower plate when the shoes are displaced laterally toward each other.

The rubber block C has substantially square portions 22—22 at opposite ends thereof, each of said end portions being interposed between the shoes of the pair at the corresponding end of the mechanism. Between its end portions 22—22, the block C is of circular cross section, and said portion of said circular cross section is contracted or tapered toward its mid portion.

The follower plates D—D, which are in the form of flat metal discs, are interposed between the upper and lower ends of the block C, and the flanges 20—20 and 20—20 of the upper and lower pairs of shoes, respectively.

My improved friction shock absorber replaces one or more of the spring units of a truck spring cluster, being interposed between the top and bottom spring plates of said cluster. To accommodate the usual spring centering projections of such follower plates, the upper inner sides of the top shoes B—B and the bottom inner sides of the bottom shoes B—B are preferably recessed, as indicated at 23—23 and 23—23.

The operation of my improved shock absorber is as follows: Upon the spring cluster of the truck of a railway car being compressed between the spring follower plates of the cluster, the top shoes B—B are forced downwardly toward the bottom shoes B—B, compressing the rubber block C lengthwise between the follower plates D—D, and at the same time forcing the top and bottom shoes inwardly, lengthwise with respect to the casing A, along the friction wedge faces of said casing, thereby forcing the shoes of each pair laterally inwardly toward each other against the resistance of the rubber block C, compressing the upper and lower ends of said block therebetween. High shock absorbing capacity is thus provided during the compression stroke of the mechanism, to snub the action of the truck springs, by the frictional resistance offered by the shoes sliding on the friction wedge faces of the casing, and the yielding resistance offered by the rubber block in being compressed lengthwise and squeezed between the friction shoes.

Upon recoil of the truck springs, the inherent resiliency of the rubber block in returning to its normal shape restores all of the parts of the mechanism to the normal full release position shown in Figure 1.

I claim:

In a friction shock absorber, the combination with a vertically disposed casing open at its top and bottom ends; of opposed, interior wedge faces on said casing at each end thereof; a pair of laterally spaced, top friction shoes slidingly engaged within the top end of the casing in wedging engagement with the wedge faces at said end of the casing; a pair of laterally spaced, bottom friction shoes slidingly engaged within the bottom end of the casing in wedging engagement with the wedge faces at said bottom end of the casing; a lengthwise extending rubber block having its top end embraced by said top shoes and its bottom end embraced by said bottom shoes; top and bottom follower plates bearing on the top and bottom ends of said block; inwardly directed flanges on the shoes of said top pair bearing on top of the top follower plate; and inwardly directed flanges on said shoes of said bottom pair bearing on the bottom side of said bottom follower plate.

GEORGE E. DATH.

REFERENCES CITED

The following references are of record in the file of this patent:

UNITED STATES PATENTS

| Number | Name | Date |
|---|---|---|
| 751,943 | Ritter | Feb. 9, 1904 |
| 1,057,521 | Berger | Apr. 1, 1913 |
| 1,882,801 | Geiger | Oct. 18, 1932 |
| 2,023,000 | Barrows | Dec. 3, 1935 |
| 2,205,098 | Lamont | June 18, 1940 |
| 2,229,750 | Lindstrom | Jan. 28, 1941 |
| 2,372,936 | Cottrell | Apr. 3, 1945 |
| 2,510,259 | Schlegel et al. | June 6, 1950 |

FOREIGN PATENTS

| Number | Country | Date |
|---|---|---|
| 329,870 | Spencer | May 29, 1930 |